(12) United States Patent
Yang et al.

(10) Patent No.: US 9,125,211 B2
(45) Date of Patent: Sep. 1, 2015

(54) SYSTEM AND METHODS FOR TRAFFIC VOLUME REPORTING DURING RADIO ACCESS NETWORK CONNECTION SETUP

(75) Inventors: Ming Yang, San Diego, CA (US); Francesco Pica, San Diego, CA (US); Long Duan, San Diego, CA (US); Leonid Golovanevsky, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 544 days.

(21) Appl. No.: 12/897,713

(22) Filed: Oct. 4, 2010

(65) Prior Publication Data

US 2011/0111765 A1 May 12, 2011

Related U.S. Application Data

(60) Provisional application No. 61/249,100, filed on Oct. 6, 2009.

(51) Int. Cl.
*H04W 72/04* (2009.01)

(52) U.S. Cl.
CPC ........ *H04W 72/0486* (2013.01); *H04W 72/042* (2013.01); *H04W 72/0413* (2013.01)

(58) Field of Classification Search
CPC ................... H04W 72/0486; H04W 72/0413; H04W 72/042
USPC ..................... 455/452.1, 513, 509, 450, 452.2
See application file for complete search history.

(56) References Cited

U.S. PATENT DOCUMENTS

| | | | |
|---|---|---|---|
| 6,640,105 B1 | 10/2003 | Shin | |
| 2004/0114574 A1* | 6/2004 | Zeira et al. | 370/352 |
| 2005/0157649 A1* | 7/2005 | Shin | 370/235 |
| 2005/0220049 A1 | 10/2005 | Zhang et al. | |
| 2008/0181127 A1 | 7/2008 | Terry et al. | |
| 2008/0194266 A1* | 8/2008 | Islam et al. | 455/450 |

(Continued)

FOREIGN PATENT DOCUMENTS

| | | |
|---|---|---|
| CN | 1669255 A | 9/2005 |
| JP | 2002152228 A | 5/2002 |

(Continued)

OTHER PUBLICATIONS

International Search Report and Written Opinion—PCT/US2010/051693—ISA/EPO—Jan. 7, 2011.

(Continued)

*Primary Examiner* — Olumide T Ajibade Akonai
*Assistant Examiner* — Edd Rianne Plata
(74) *Attorney, Agent, or Firm* — Kristine U. Ekwueme

(57) ABSTRACT

Disclosed are systems, methods and computer program products for traffic volume reporting during radio access network (RAN) connection setup. In one aspect, the RAN broadcasts an indicator that it accepts traffic volume measurements (TVM) from access terminals (ATs) and an associated TVM threshold. An AT measures its traffic volume before requesting a connection with the RAN. If the traffic volume is above the threshold, AT transmits to the RAN a connection request containing a TVM indicator that the measured traffic volume from the AT is above the threshold. If the traffic volume is below the threshold, AT transmits to the RAN a connection request containing a TVM indicator that the traffic volume is below the threshold.

23 Claims, 6 Drawing Sheets

(56) References Cited

U.S. PATENT DOCUMENTS

| | | | |
|---|---|---|---|
| 2009/0316637 A1* | 12/2009 | Yi et al. .................. 370/329 |
| 2010/0271966 A1 | 10/2010 | Hirano et al. | |

FOREIGN PATENT DOCUMENTS

| | | |
|---|---|---|
| JP | 2003513534 A | 4/2003 |
| JP | 2007511963 A | 5/2007 |
| JP | 2007522763 A | 8/2007 |
| JP | 2007531464 A | 11/2007 |
| JP | 2008545338 A | 12/2008 |
| JP | 2010517481 A | 5/2010 |
| JP | 2010536256 A | 11/2010 |
| WO | 0131950 A1 | 5/2001 |
| WO | 2005050851 A2 | 6/2005 |
| WO | 2005104461 A1 | 11/2005 |
| WO | 2007005311 A2 | 1/2007 |
| WO | 2008094681 A1 | 8/2008 |
| WO | 2009020926 A1 | 2/2009 |
| WO | 2009072286 A1 | 6/2009 |

OTHER PUBLICATIONS

Ericsson: "Traffic Volume Measurements", 3GPP Draft; R2-99594, 3rd Generation Partnership Project (3GPP), Mobile Competence Centre ; 650, Route Des Lucioles ; F-06921 Sophia-Antipolis Ex ; France,vol. RAN WG2, No. Sophia Antipolis; 19990705, Jul. 5, 1999,XP050112936, [retrieved on Jul. 5, 1999].
Taiwan Search Report—TW099134069—TIPO—Jun. 10, 2013.

* cited by examiner

SYSTEM AND METHODS FOR TRAFFIC VOLUME REPORTING DURING RADIO ACCESS NETWORK CONNECTION SETUP

CLAIM OF PRIORITY UNDER 35 U.S.C. §119

The present application for patent claims priority to Provisional Application No. 61/249,100, entitled "Enhanced Traffic Volume Reporting Mechanisms to Minimize Unnecessary RRC State Transition for PS Calls" filed Oct. 6, 2009, and assigned to the assignee hereof and hereby expressly incorporated by reference herein.

BACKGROUND

1. Field

This disclosure relates generally to the field of communications and more specifically to the system and methods for traffic volume reporting by an access terminal during connection setup with a radio access network.

2. Background

Radio access networks (RANs) are widely deployed to provide voice, data and multimedia services, to mobile devices also known as access terminals (AT). RANs typically use different radio access technologies, such as code division multiple access (CDMA) used in CDMA2000 networks, wideband CDMA technology used in a universal mobile telecommunication system (UMTS) and UMTS terrestrial radio access network (UTRAN), time division multiple access (TDMA) technology used in Global System for Mobile communications (GSM), and frequency division multiple access (FDMA) used in 3rd Generation Partnership Project (3GPP) Long Term Evolution (LTE) networks. The primary task of any radio access technology is to efficiently allocate a limited number of available radio channels to all mobile devices connected to the network in order to avoid data traffic congestion, dropped calls or other undesirable service interruptions.

UTRAN, other wideband CDMA systems and LTE use a radio resource control (RRC) protocol to control allocation of radio channels to ATs. For 3GPP based systems, RRC protocol is described in 3GPP TS 25.331 or 36.331. For UTRAN systems, the RRC protocol, at the time of a new RRC signaling connection setup, can allocate either a dedicated radio channel (DCH) or a common radio channel (FACH), which is shared among several ATs, to the ATs connected to the network based on RNC specific implementation algorithms. In the majority of currently deployed UTRAN networks, RRC automatically assigns a dedicated radio channel (DCH) to the AT during new connection setup and then reassigns a common radio channel (FACH) if traffic volume from the AT is low or after a certain inactivity time. These channel reassignments, also known as RRC state transitions, when triggered by many ATs, waste RAN's processing load and may impact RAN's over-the-air and backhaul capacity. AT's battery is also impacted when it is allocated DCH channels for transmitting a small amount of data. LTE systems, such as enhanced UTRAN (E-UTRAN), have similar issues when RRC allocates different dedicated channels with a short or long discontinuous reception (DRX) cycle, based on the amount of data to transmit. Accordingly, there is a need to improve RRC channel allocation scheme during new connection setup in UTRAN, other wideband CDMA systems and LTE networks.

SUMMARY

To address these and other limitations of prior art, disclosed herein are system, methods and computer program products for traffic volume reporting by an access terminal during new connection setup with a radio access network (RAN) and a new scheme for channel allocation by the RAN. The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, RAN includes an enhanced traffic volume measurement (TVM) reporting flag and associated TVM threshold in its network broadcast messages. The enhanced TVM reporting flag indicates that RAN accepts TVM reports from ATs during RRC connection setup. An AT measures its traffic volume before requesting a connection with the RAN by, for example, determining the amount of data in its transmitter buffer. If the traffic volume is above the threshold, AT transmits to the RAN a connection request containing a TVM indicator that the measured traffic volume from the AT is above the threshold. Alternatively, AT can directly report, in the connection request, the amount of data in its buffer. In response, a UTRAN can allocate to the AT a dedicated radio channel (DCH), while E-UTRAN can allocate a dedicated radio channel with short DRX cycle. If the traffic volume is below the threshold, AT transmits to the RAN a connection request containing a TVM indicator that the traffic volume is below the threshold. In response, the UTRAN can allocate to the AT a common radio channel (FACH), which is shared by several ATs, while E-UTRAN can allocate to the AT a dedicated radio channel with a long DRX cycle.

The following description and the annexed drawings set forth in detail, certain illustrative features of the one or more aspects of system, methods and computer program products for performing radio channel allocation in radio access networks. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects of methodologies for new radio resource control (RRC) connection setup and radio channel allocation in UTRAN are now described with reference to the drawings. It should be noted however that the new connection setup and channel allocation methodologies disclosed herein are not limited to the RRC implementation in UTRAN, but may be used in other protocols of W-CDMA or LTE networks. In the following description, for purposes of explanation, numerous specific details are set forth in order to provide a thorough understanding of one or more aspects. It may be evident, however, that such aspect(s) may be practiced without these specific details.

Figure 1:
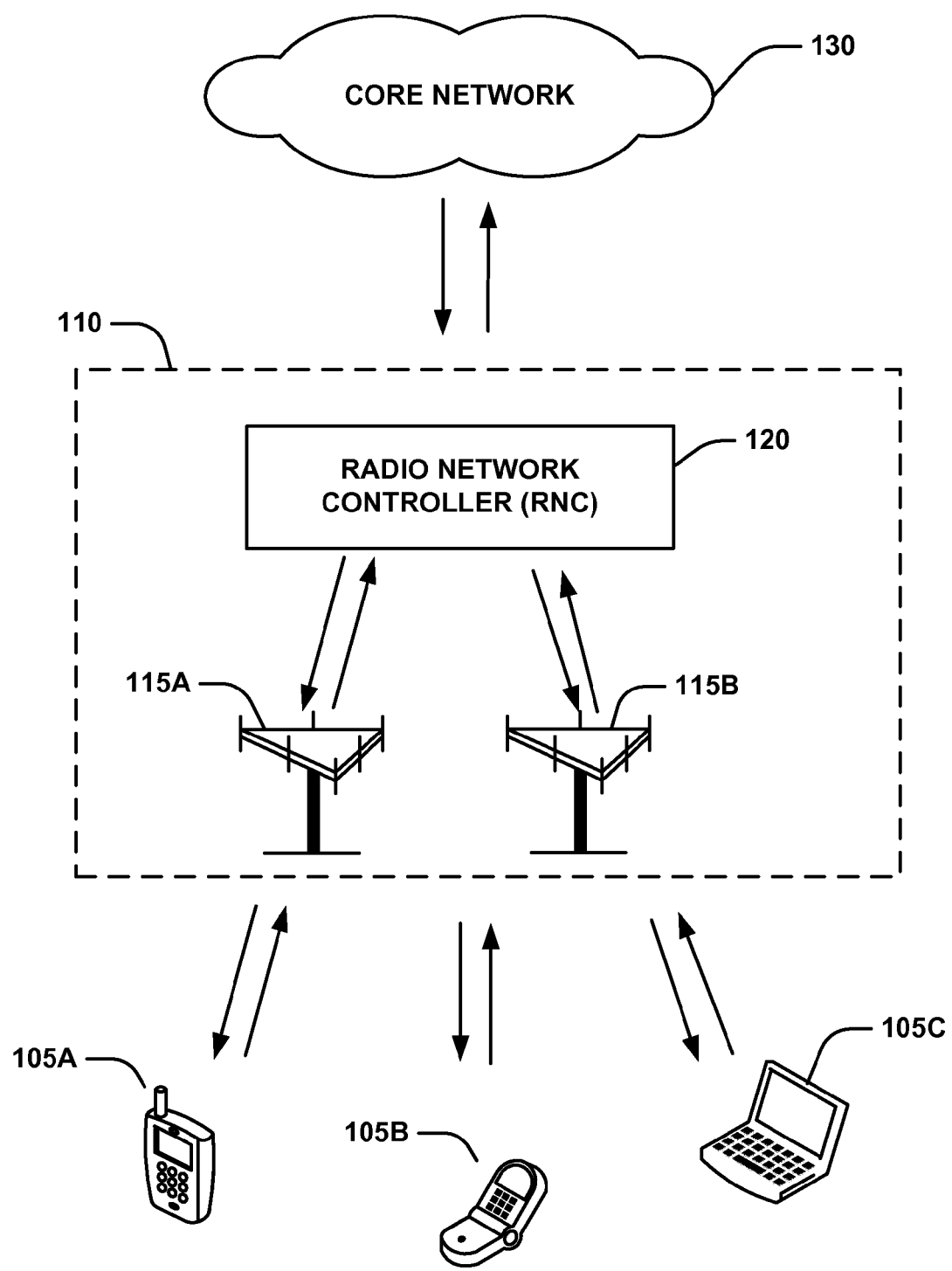
FIG. 1 is an illustration of a wireless communication system for implementing methodologies for new connection setup and channel allocation in accordance with aspects disclosed herein.

FIG. 1 illustrates one aspect of a wireless communication system 100 that is used to implement methodologies for new connection setup and channel allocation in accordance with aspects disclosed herein. As depicted, system 100 includes one or more access terminals (ATs) 105 configured to communicate using radio frequency (RF) signals with a radio access network (RAN) 110. RAN 110 is configured to provide to the ATs 105 wireless access to the voice, data, multimedia and other services of a core network 130. Core network 130 may include a packet-switched data network, such as the Internet, or a circuit-switched network, such as a public switched telephone network (PSTN). It is to be understood and appreciated that the wireless communication system 100 may include additional networks, systems, devices, components, modules, etc. and/or may not include all of the networks, devices, components, modules etc. discussed in connection with the figures. A combination of these approaches may also be used.

In one aspect, access terminal 105 may include, but not limited to, a cellular telephone, a cordless telephone, a session initiation protocol (SIP) phone, a personal digital assistant (PDA), a laptop computer, or other mobile device having wireless connection capability, such as a cellular, 802.11 or Bluetooth modem. Access terminal 105 may also be referred to as a mobile device, subscriber unit, subscriber station, mobile station, mobile, remote station, remote terminal, user terminal, terminal, wireless communication device, user agent, user device, user equipment (UE) or the like. In one example embodiment, AT 105 supports radio resource control (RRC) protocol for communicating with UMTS, UTRAN and other wideband-CDMA networks 110.

In various aspects, radio access network (RAN) 110 may include a universal mobile telecommunication system (UMTS), UMTS terrestrial radio access network (UTRAN), CDMA2000 and other wideband-CDMA (W-CDMA) or other variants of CDMA. UMTS and UTRAN are described in documents from an organization named "3rd Generation Partnership Project" (3GPP). Additionally, CDMA2000 is described in documents from an organization named "3rd Generation Partnership Project 2" (3GPP2). Further, RAN 110 may additionally include peer-to-peer (e.g., mobile-to-mobile) ad hoc network systems often using unpaired unlicensed spectrums, 802.xx wireless LAN, Bluetooth and any other short- or long-range, wireless communication techniques.

Generally, RAN 110 may include a plurality of cells (not shown), each cell having one or more radio base stations 115. Radio base stations 115 may include multiple antenna groups and/or a transmitter/receiver chain that can in turn comprise a plurality of components associated with radio signal transmission and reception (e.g., processors, modulators, multiplexers, antennas, etc. (not shown)) to and from the ATs 105. One or more radio base stations 115 may be connected to a radio network controller (RNC) 120. RNC 120 is network equipment providing setup and termination of radio connections, management of radio sessions, radio resource allocation and mobility management for ATs 105. In one aspect, RNC 120 also supports RRC protocol.

As explained above, RRC protocol enables RNC 120 to allocate to ATs either a dedicated radio channel (DCH) or a common radio channel (FACH) at RRC connection establishment, which is shared among several ATs 105, based on RNC implementation choices. Typically, RRC provides for automatic assignment of a dedicated radio channel (DCH) to the AT during new connection setup and then reassigns to the AT a common radio channel (FACH) if traffic volume from the AT is low or null. These channel reassignments, also known as RRC state transitions, when triggered by many ATs, waste RNC's processing load and may impact RAN's over-the-air and backhaul capacity. AT's battery is also impacted when it is allocated DCH channels.

In order to improve the existing RRC channel allocation scheme, an enhanced TVM reporting procedure may be used during new RRC connection setup in accordance with one aspect. For example, RNC 120 may be configured to include in its RRC system broadcast message (i) a TVM flag indicating that RAN 110 supports enhanced TVM reporting functionality and/or (ii) an associated TVM threshold. The TVM threshold may be set by the administrator of RAN 110 at, for example, 512 KB. When the TVM flag is set to TRUE, AT 105 may be configured to measure its traffic volume before requesting a connection with the RAN 110. For example, AT 105 may measure the number of bytes of data in its transmitter buffer as an indicator of its traffic volume. If the TVM is above the TVM threshold, AT 105 may be configured to transmit to the RNC 115 a RRC connection request containing a TVM indicator that the measured traffic volume from the AT is above the threshold. Alternatively, AT 105 can transmit the actual TVM value in the RRC connection request message. In response, RNC 115 may allocate to the AT 105 a dedicated radio channel (DCH) in UTRAN or a dedicated radio channel with short discontinuous reception (DRX) cycle in LTE. If the TVM is below the threshold, AT 105 may transmit to the RNC 115 a connection request containing a TVM indicator that the traffic volume is below the threshold. Alternatively, AT 105 can transmit the actual TVM value in the RRC connection request message. In response, RNC 115 may allocate to the AT 105 a common radio channel (FACH), which is shared by several ATs in UTRAN or a dedicated radio channel with long DRX cycle in LTE. AT 105 may then establish a point-to-point bi-directional connection with the RNC 115 using the allocated radio channel for communication with RNC 115. This connection setup and channel allocation mechanism minimizes unnecessary RRC state transitions or DRX cycle changes at the RNC 115, reduces signaling load between AT 105 and RNC 115 and decreases RNC processing load.

Figure 2:
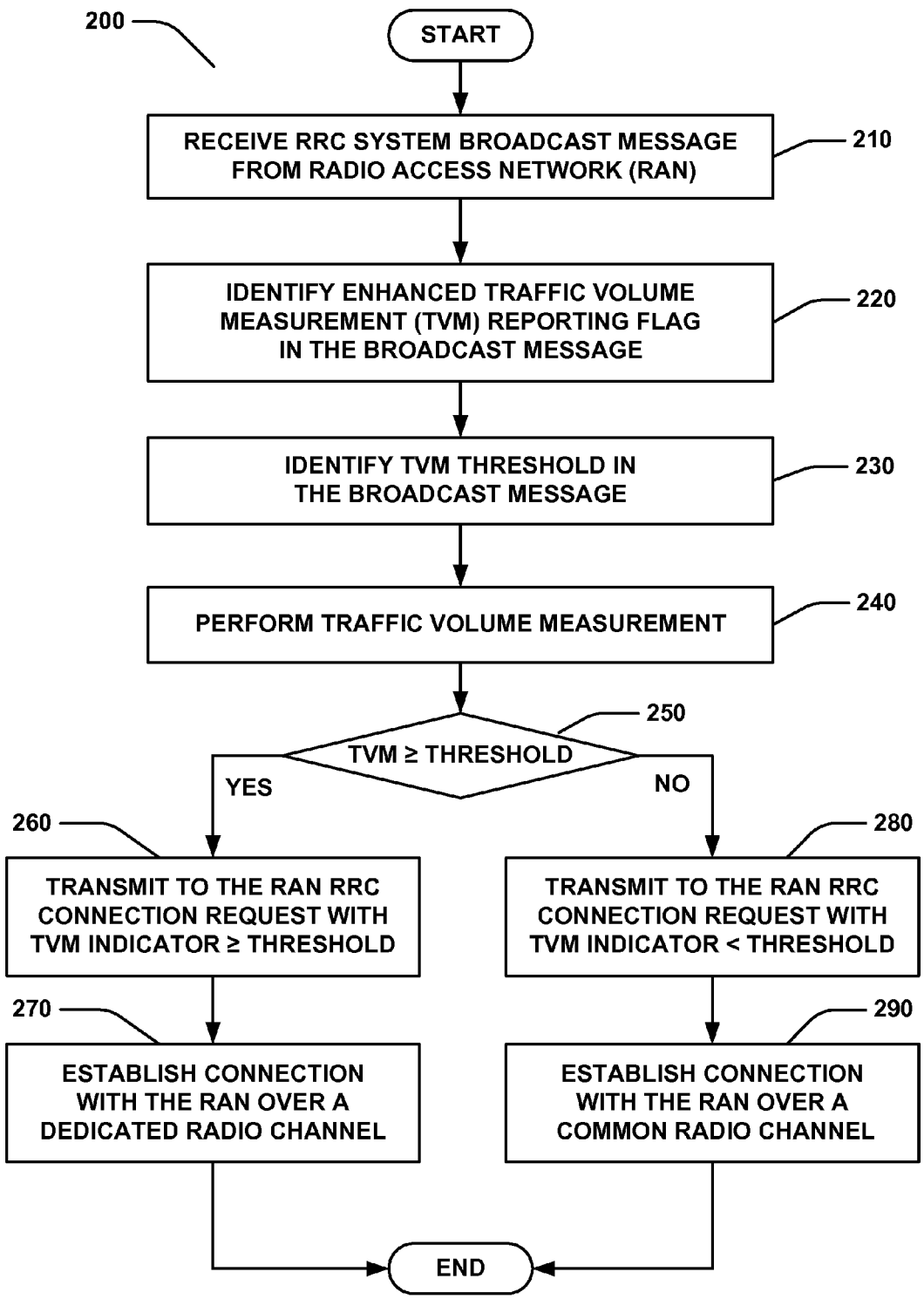
FIG. 2 is an illustration of an example methodology for new connection setup by an access terminal with a radio access network in accordance with one aspect.

FIG. 2 is illustrates a methodology 200 implemented in an access terminal, such as AT 105, for new connection setup in UTRAN, in accordance with one aspect. When AT 105 enters the coverage area of RAN 110, it begins to listen for RRC system broadcast messages containing network-related information from RNC 115. At step 210, AT 105 receives from RNC 115 a system broadcast message. At step 220, AT 105 identifies an enhanced TVM reporting flag within the broadcast message. If the enhanced TVM reporting flag is set to TRUE, at step 230, AT 105 identifies TVM threshold value within the system broadcast message. At step 240, AT 105 performs traffic volume measurement by, for example, determining the number of bytes in its transmitter buffer. At step 250, AT 105 compares the measured traffic volume with the TVM threshold and, if the traffic volume is above the threshold, at step 260, transmits to the RNC 115 a RRC connection request containing a TVM indicator set to TRUE ("1"), which indicates that the measured traffic volume at the AT 105 is above the TVM threshold. Alternatively, AT 105 can transmit the actual TVM value in the RRC connection request message. At step 270, AT 105 and RNC 115 establish a RRC connection over a dedicated radio channel (DCH) allocated by RNC 115 to AT 105 to accommodate the large traffic volume from the AT 105. However, if, at step 250, AT 105 determines that the traffic volume is below the TVM threshold, AT 105 transmits, at step 280, to the RNC 115 a RRC connection request containing a TVM indicator set to FALSE ("0"), which indicates that the measured traffic volume at the AT 105 is below the TVM threshold. Alternatively, AT 105 can transmit the actual TVM value in the RRC connection request message. At step 290, AT 105 and RNC 115 establish a RRC connection over common radio channel (FACH) allocated by RNC 115 to AT 105. Common channel is shared among ATs having low traffic volume.

Figure 3:
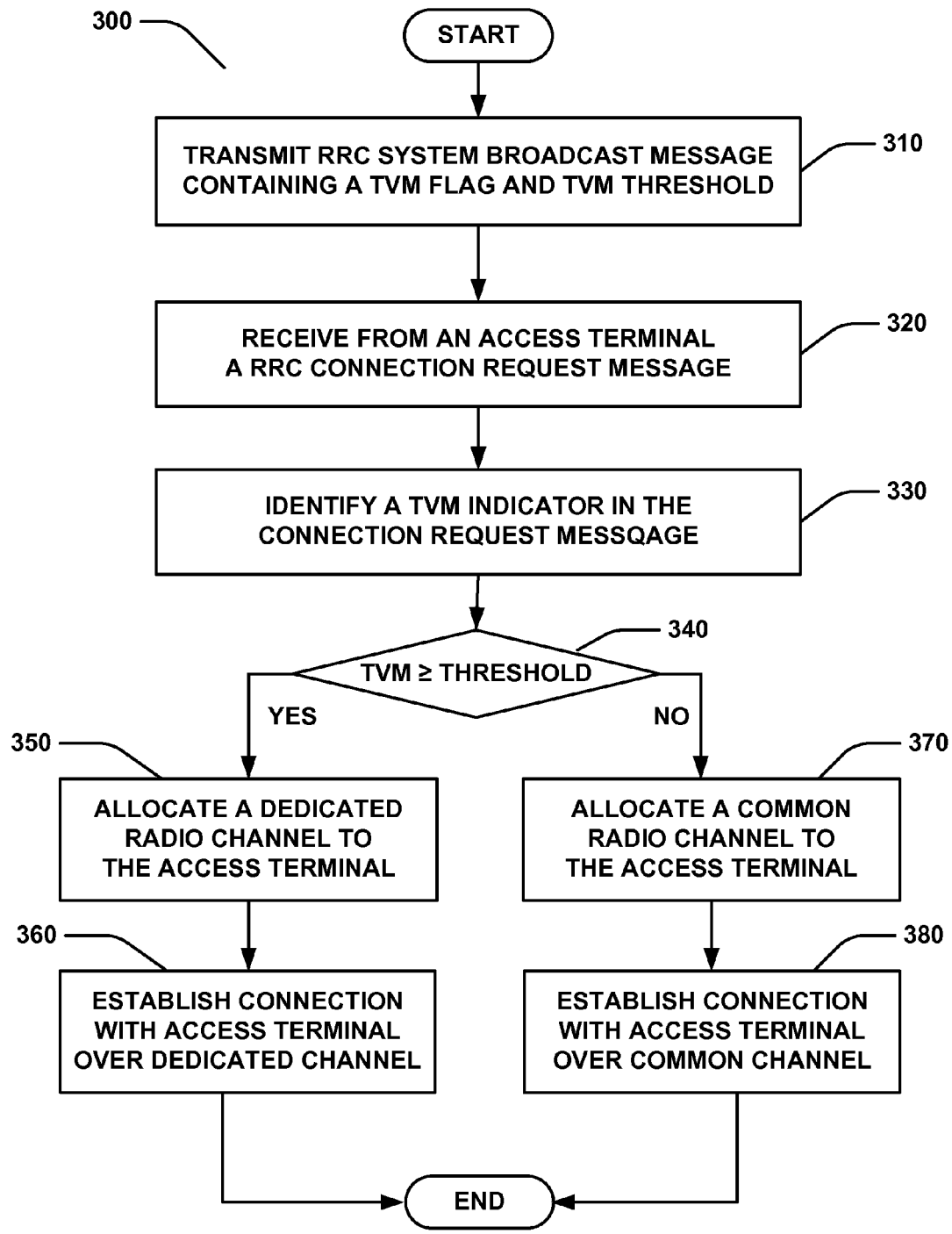
FIG. 3 is an illustration of an example methodology for radio channel allocation by the radio access network in accordance with one aspect.

FIG. 3 is an illustration of an example methodology 300 for radio channel allocation by a radio access network, such as RAN 110, in accordance with one aspect. At step 310, RNC 115 periodically transmits RRC system broadcast messages, which contain network-related information as well as an enhanced TVM reporting flag and an associated TVM threshold. At step 320, RNC 115 receives from AT 105 a RRC connection request. At step 330, RNC 115 identifies a TVM indicator in the received RRC connection request. If, at step 340, RNC 115 determines that the TVM indictor is set to TRUE or the TVM value is above the TVM threshold, RNC 115, at step 350, allocates a dedicated radio channel (DCH) to the AT 105 if in UTRAN, or a short DRX cycle if in E-UTRAN. At step 360, RNC 115 and AT 105 establish a RRC connection over the dedicated radio channel (DCH) or using the short DRX cycle. If, at step 340, RNC 115 determines that the TVM indictor is set to FALSE or the TVM value is below the TVM threshold, RNC 115, at step 370, allocates a common radio channel (FACH) to the AT 105 if in UTRAN or a long DRX cycle if in E-UTRAN. Finally, at step 380, RNC 115 and AT 105 establish a RRC connection over the common radio channel (FACH) or using the long DRX cycle. In one aspect, RNC 115 may subsequently reassign a different radio channel or DRX cycle to AT 105 if traffic volume from the AT changes.

Figure 4:
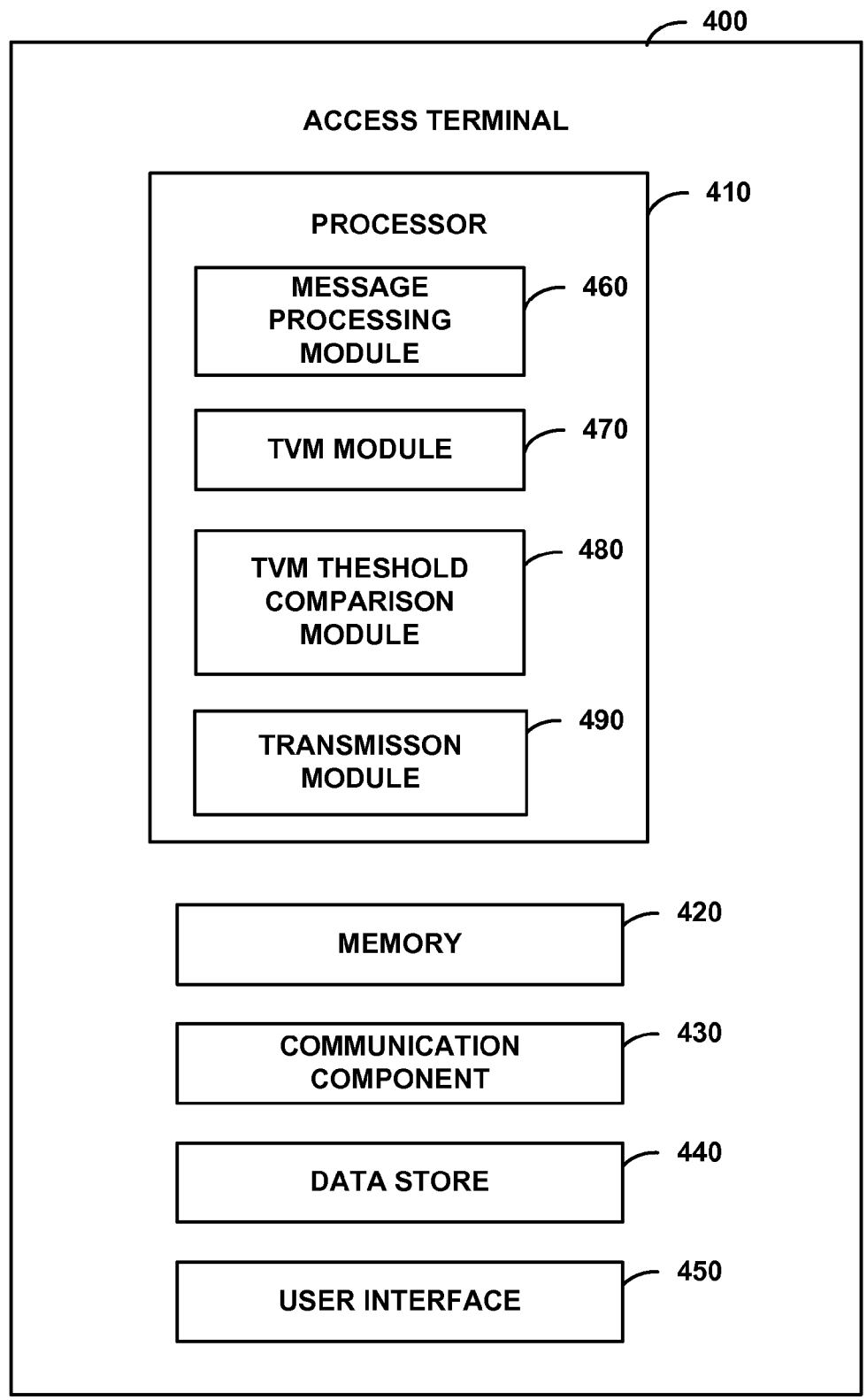
FIG. 4 is an illustration of an example configuration of an access terminal in accordance with one aspect.

FIG. 4 illustrates an example configuration of an access terminal in accordance with one aspect. Access terminal 400 includes a processor 410 for carrying out processing functions associated with one or more of components and functions described herein. Processor 410 can include a single or multiple set of processors or multi-core processors. Access terminal 400 further includes a memory 420 coupled to processor 410, such as for storing local versions of applications being executed by processor 410. Memory 420 can include any type of memory usable by a computer, such as random access memory (RAM), read only memory (ROM), magnetic discs, optical discs, volatile memory, non-volatile memory, and any combination thereof.

Further, access terminal 400 includes one or more communications components 430, such as radio transceiver(s), coupled to processor 410 for establishing and maintaining communications with one or more radio access networks utilizing hardware, software, and services as described herein. For example, communications component 430 may include transmit chain components and receive chain components associated with a transmitter and receiver, respectively, operable for interfacing with external radio networks and devices. Additionally, access terminal 400 may further include a data store 440 coupled to processor 410, which can be any suitable combination of hardware and/or software, that provides for mass storage of information, databases, and programs employed in connection with aspects described herein. For example, data store 440 may be a data repository for applications not currently being executed by processor 410.

Access terminal 400 may include a user interface component 450 coupled to processor 410 and being operable to receive inputs from a user of access terminal 400 and further operable to generate outputs for presentation to the user. User interface component 450 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 450 may include one or more output devices, including but not limited to a display, a speaker, a haptic feedback mechanism, a printer, any other mechanism capable of presenting an output to a user, or any combination thereof.

In one example aspect, processor 410 includes software modules 460-480 that facilitate execution of algorithms for new RRC connection setup with a radio access network, such as UMTS, UTRAN, E-UTRAN or other network that supports the RRC protocol. In particular, processor 410 includes a message processing module 460 for receiving via communication component 430 a RRC network broadcast message from the RAN and determines if the message contains a TVM flag indicating that RAN supports enhanced TVM reporting functionality and an associated TVM threshold. Processor 410 also includes a TVM module 470 for measuring traffic volume measurement in the transmitter buffer of the memory 420. Processor 410 also includes a TVM threshold comparison module 480 for comparing the measured traffic volume with the TVM threshold and determining if the measured traffic volume is above or below the TVM threshold. Processor 410 also includes a transmission module 490 for generating and transmitting via communication component 430 a RRC connection request message containing a TVM indicator that traffic volume is above or below the threshold. The transmission module 490 also establishes a connection via communication component 430 with the RAN over a dedicated or common radio channel allocated by the RAN based on the value of the TVM indicator in the RRC connection request message. Processor 410 may include other modules for performing setup or termination of RRC connections between access terminal and the RAN in accordance with various aspects.

Figure 5:
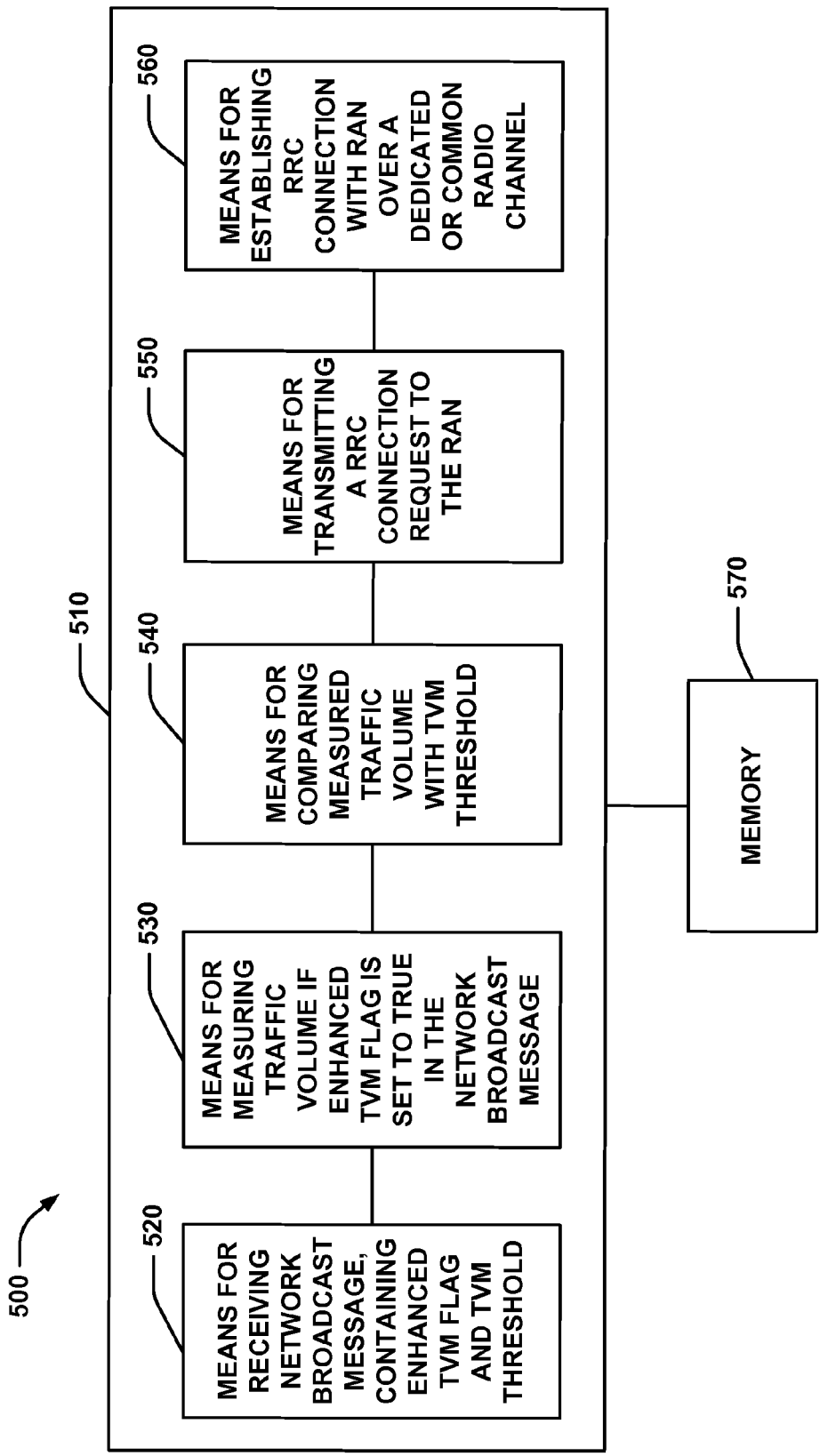
FIG. 5 is an illustration of an example communication apparatus in accordance with one aspect.

FIG. 5 illustrates an example configuration of a communication apparatus in accordance with one aspect. As depicted, apparatus 500 includes functional blocks that can represent functions implemented by a processor, software, or combination thereof (e.g., firmware). Apparatus 500 includes a logical grouping 510 of electrical components that facilitate execution of algorithms for new RRC connection setup with a radio access network, such as UMTS, UTRAN, E-UTRAN or other network that supports RRC protocol. Logical grouping 510 can include means 520 for receiving a RRC network broadcast message that contains a TVM flag indicating that RAN supports enhanced TVM reporting functionality and an associated TVM threshold. Logical grouping 510 can include means 530 for measuring traffic volume if the enhanced TVM flag is set to TRUE. Moreover, logical grouping 510 can include means 540 for comparing the measured traffic volume with the TVM threshold. Furthermore, logical grouping 510 can include means 550 for transmitting a RRC connection request message containing a TVM indicator that traffic volume is above or below the threshold. In addition, logical grouping 510 can include means 560 for establishing a RRC connection with the RAN over a dedicated or common radio channel (or dedicate radio channel with short or long DRX cycle if in E-UTRAN) allocated by the RAN based on the value of the TVM indicator in the RRC connection request message. Additionally, apparatus 500 can include a memory 570 that retains instructions for executing functions associated with electrical components 520 to 560. While shown as being external to memory 570, it is to be understood that electrical components 520 to 560 can exist within memory 570.

Figure 6:
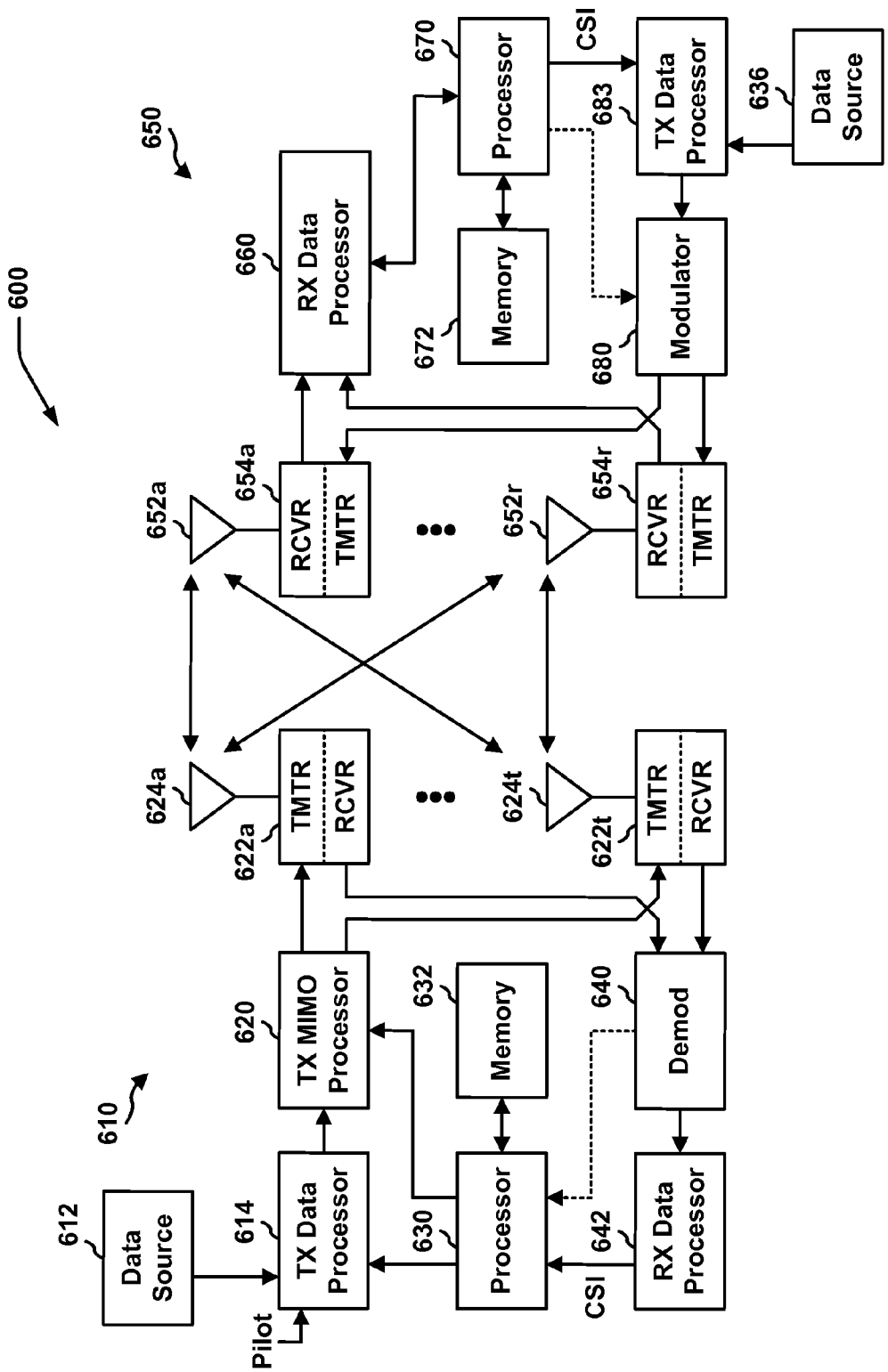
FIG. 6 is an illustration of an example wireless communication system in accordance with one aspect.

FIG. 6 shows an example of a wireless communication system 600 in which various aspects of the methodologies for new connection setup and channel allocation may be implemented. The system 600 depicts one base station/forward link transmitter 610 in a radio access network and one mobile device 650 for sake of brevity. However, it is to be appreciated that system 600 can include more than one base station/forward link transmitter and/or more than one mobile device, wherein additional base stations/transmitters and/or mobile devices can be substantially similar or different from example base station/forward link transmitters 610 and mobile device 650 described below. In addition, it is to be appreciated that base station/forward link transmitter 610 and/or mobile device 650 can employ the systems (FIGS. 1, 4 and 5) and/or methods (FIGS. 2 and 3) described herein to facilitate new connection setup and channel allocation procedures and wireless communication there between.

At base station/forward link transmitter 610, traffic data for a number of data streams is provided from a data source 612 to a transmit (TX) data processor 614. According to an example, each data stream can be transmitted over a respective antenna. TX data processor 614 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 650 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 630.

The modulation symbols for the data streams can be provided to a TX MIMO processor 620, which can further process the modulation symbols (e.g., for OFDM). TX MIMO processor 620 then provides NT modulation symbol streams to NT transmitters (TMTR) 622a through 622t. In various aspects, TX MIMO processor 620 applies beamforming weights to the symbols of the data streams and to the antenna from which the symbol is being transmitted.

Each transmitter 622 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 622a through 622t are transmitted from NT antennas 624a through 624t, respectively.

At mobile device 650, the transmitted modulated signals are received by NR antennas 652a through 652r and the received signal from each antenna 652 is provided to a respective receiver (RCVR) 654a through 654r. Each receiver 654 conditions (e.g., filters, amplifies, and downconverts) a respective signal, digitizes the conditioned signal to provide samples, and further processes the samples to provide a corresponding "received" symbol stream.

An RX data processor 660 can receive and process the NR received symbol streams from NR receivers 654 based on a particular receiver processing technique to provide NT "detected" symbol streams. RX data processor 660 can demodulate, deinterleave, and decode each detected symbol stream to recover the traffic data for the data stream. The processing by RX data processor 660 is complementary to that performed by TX MIMO processor 620 and TX data processor 614 at base station/forward link transmitter 610.

A processor 670 can periodically determine which precoding matrix to utilize as discussed above. Further, processor 670 can formulate a reverse link message comprising a matrix index portion and a rank value portion.

The reverse link message can comprise various types of information regarding the communication link and/or the received data stream. The reverse link message can be processed by a TX data processor 638, which also receives traffic data for a number of data streams from a data source 636, modulated by a modulator 680, conditioned by transmitters 654a through 654r, and transmitted back to base station/forward link transmitter 610.

At base station/forward link transmitter 610, the modulated signals from mobile device 650 can be received by antennas 624, conditioned by receivers 622, demodulated by a demodulator 640, and processed by a RX data processor 642 to extract the reverse link message transmitted by mobile device 650. Further, processor 630 can process the extracted message to determine which precoding matrix to use for determining the beamforming weights. It is to be appreciated that in the case of a forward link transmitter 810, as opposed to a base station, these RX components may not be present since data is only broadcasted over the forward link.

Processors 630 and 670 can direct (e.g., control, coordinate, manage, etc.) operation at base station/forward link transmitter 610 and mobile device 650, respectively. Respective processors 630 and 670 can be associated with memory 632 and 672 that store program codes and data. Processors 630 and 670 can also perform computations to derive frequency and impulse response estimates for the uplink and downlink, respectively.

It is to be understood that the aspects described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the aspects are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means known in the art.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects, it should be noted that various changes and modifications could be made herein without departing from the scope of the described aspects as defined by the appended claims. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise.

What is claimed is:

1. A method for establishing connection with a radio access network, the method comprising:

receiving from a radio access network a broadcast message containing one or more of (i) an indicator that the radio access network accepts traffic volume measurements (TVM) from access terminals and (ii) an associated traffic volume threshold for the access terminals;

measuring at the access terminal the traffic volume for the radio access network before requesting a new connection with the radio access network;

comparing the measured traffic volume with the traffic volume threshold; and when the traffic volume is above the threshold, transmitting to the radio access network a first connection request containing a TVM indicator that the measured traffic volume from the access terminal is above the threshold, wherein the first connection request is configured to cause the radio access network to allocate a dedicated radio channel for communication with the access terminal, and establishing the new connection with the radio access network over the dedicated radio channel; or when the traffic volume is below the threshold, transmitting to the radio access network a second connection request containing a TVM indicator that the traffic volume from the access terminal is below the threshold, wherein the second connection request is configured to cause the radio access network to allocate a common radio channel for communication with the access terminal, and establishing the new connection with the radio access network over the common radio channel;

wherein the dedicated radio channel includes a channel with a short discontinuous reception (DRX) cycle allocated by the radio access network to the access terminal in response to the first connection request and wherein the radio access network is a long term evolution (LTE) network.

2. The method of claim 1, wherein measuring traffic volume includes determining the amount of data in a transmitter buffer of the access terminal.

3. The method of claim 1, wherein the TVM indicator is the actual value of the measured traffic volume.

4. The method of claim 1, wherein the first or the second connection request is a radio resource control (RRC) connection request.

5. The method of claim 1, wherein the dedicated radio channel is exclusively used by the access terminal for communication with the radio access network and wherein the radio access network is a universal mobile telecommunication system (UMTS) terrestrial radio access network (UTRAN).

6. The method of claim 1, wherein the common radio channel is shared by a plurality of access terminals for communication with the radio access network and wherein the radio access network is a UTRAN.

7. A method for establishing connection with a radio access network, the method comprising:
   receiving from a radio access network a broadcast message containing one or more of (i) an indicator that the radio access network accepts traffic volume measurements (TVM) from access terminals and (ii) an associated traffic volume threshold for the access terminals;
   measuring at the access terminal the traffic volume for the radio access network before requesting a new connection with the radio access network;
   comparing the measured traffic volume with the traffic volume threshold; and
   when the traffic volume is above the threshold, transmitting to the radio access network a first connection request containing a TVM indicator that the measured traffic volume from the access terminal is above the threshold, wherein the first connection request is configured to cause the radio access network to allocate a dedicated radio channel with a short DRX cycle for communication with the access terminal, and establishing the new connection with the radio access network over the dedicated radio channel with the short DRX cycle; or
   when the traffic volume is below the threshold, transmitting to the radio access network a second connection request containing a TVM indicator that the traffic volume from the access terminal is below the threshold, wherein the second connection request is configured to cause the radio access network to allocate a dedicated radio channel with a long DRX cycle for communication with the access terminal, and establishing the new connection with the radio access network over the dedicated radio channel with the long DRX.

8. A method for establishing connection with an access terminal, the method comprising:
   broadcasting by a radio access network a message containing one or more of (i) an indicator that the radio access network accepts traffic volume measurements (TVM) from access terminals and (ii) an associated traffic volume threshold for the access terminals;
   receiving from an access terminal a new connection request containing a TVM indicator that the measured traffic volume is above or below the threshold; and
   determining based on the received TVM indicator when the traffic volume from the access terminal is above the threshold and allocating a dedicated radio channel to the access terminal for communication with the radio access network; or
   determining based on the received TVM indicator when the traffic volume from the access terminal is below the threshold and allocating a common radio channel to the access terminal for communication with the radio access network; and
   establishing a new connection with the access terminal over the allocated channel;
   wherein the dedicated radio channel is a dedicated radio channel with short discontinuous reception (DRX) cycle and wherein the radio access network is a long term evolution (LTE) network.

9. The method of claim 8, wherein the dedicated radio channel exclusively used by the access terminal for communication with the radio access network and wherein the radio access network is a UTRAN.

10. The method of claim 8, wherein the common radio channel shared by a plurality of access terminals for communication with the radio access network and wherein the radio access network is a UTRAN.

11. The method of claim 8, wherein the TVM indicator is the actual value of the measured traffic volume.

12. The method of claim 8, wherein the connection request is a radio resource control (RRC) connection request.

13. A method for establishing connection with an access terminal, the method comprising:
   broadcasting by a radio access network a message containing one or more of (i) an indicator that the radio access network accepts traffic volume measurements (TVM) from access terminals and (ii) an associated traffic volume threshold for the access terminals;
   receiving from an access terminal a new connection request containing a TVM indicator that the measured traffic volume is above or below the threshold; and
   determining based on the received TVM indicator when the traffic volume from the access terminal is above the threshold and allocating a dedicated radio channel with a short DRX cycle to the access terminal for communication with the radio access network; or
   determining based on the received TVM indicator when the traffic volume from the access terminal is below the threshold and allocating a dedicated radio channel with a long DRX cycle to the access terminal for communication with the radio access network; and
   establishing a new connection with the access terminal over the allocated channel.

14. An access terminal for establishing connection with a radio access network, the access terminal comprising:
   a communication component configured to receive from the radio access network a broadcast message containing one or more of (i) an indicator that the radio access network accepts traffic volume measurements (TVM) from access terminals and (ii) an associated traffic volume threshold for the access terminals;
   a processor coupled to the communication component, the processor being configured to measure the traffic volume for the radio access network before requesting a new connection with the radio access network and compare the measured traffic volume with the traffic volume threshold; and
   when the traffic volume is above the threshold, the communication component is configured to transmit the radio access network a first connection request containing a TVM indicator that the measured traffic volume is above the threshold, wherein the first connection request is configured to cause the radio access network to allocate a dedicated radio channel for communication with the access terminal, and the communication component further configured to establish the new connection with the radio access network over the dedicated radio channel; or
   when the traffic volume is below the threshold, the communications component is configured to transmit to the radio access network a second connection request containing a NM indicator that the traffic volume from the access terminal is below the threshold, wherein the second connection request is configured to cause the radio access network to allocate a common radio channel for communication with the access terminal, and the communication component further configured to establish the new connection with the radio access network over the common radio channel;

wherein the dedicated radio channel includes a channel with a short discontinuous reception (DRX) cycle allocated by the radio access network to the access terminal in response to the first connection request and wherein the radio access network is a long term evolution (LTE) network.

15. The access terminal of claim 14, wherein the dedicated radio channel is exclusively used by the access terminal for communication with the radio access network and wherein the radio access network is a UTRAN.

16. The access terminal of claim 14, wherein the common radio channel is shared by a plurality of access terminals for communication with the radio access network and wherein the radio access network is a UTRAN.

17. An access terminal for establishing connection with a radio access network, the access terminal comprising:
a communication component configured to receive from the radio access network a broadcast message containing one or more of (i) an indicator that the radio access network accepts traffic volume measurements (TVM) from access terminals and (ii) an associated traffic volume threshold for the access terminals;
a processor coupled to the communication component, the processor being configured to measure the traffic volume for the radio access network before requesting a new connection with the radio access network and compare the measured traffic volume with the traffic volume threshold; and
when the traffic volume is above the threshold, the communication component is configured to transmit the radio access network a first connection request containing a TVM indicator that the measured traffic volume is above the threshold, wherein the first connection request is configured to cause the radio access network to allocate a dedicated radio channel with a short DRX cycle for communication with the access terminal, and the communication component further configured to establish the new connection with the radio access network over the dedicated radio channel with the short DRX cycle; or
when the traffic volume is below the threshold, the communications component is configured to transmit to the radio access network a second connection request containing a TVM indicator that the traffic volume from the access terminal is below the threshold, wherein the second connection request is configured to cause the radio access network to allocate a dedicated radio channel with a long DRX cycle for communication with the access terminal, and wherein the communication component is further configured to establish the new connection with the radio access network over the dedicated radio channel with the long DRX cycle.

18. A computer program product for establishing connection with a radio access network, the product comprising a non-transitory computer-readable medium comprising:
a first set of codes for receiving from a radio access network a broadcast message containing one or more of (i) an indicator that the radio access network accepts traffic volume measurements (TVM) from access terminals and (ii) an associated traffic volume threshold for the access terminals;
a second set of codes for measuring at an access terminal the traffic volume for the radio access network before requesting a new connection with the radio access network;
a third set of codes for comparing the measured traffic volume with the traffic volume threshold; and
a fourth set of codes for, when the traffic volume is above the threshold, transmitting to the radio access network a first connection request containing a TVM indicator that the measured traffic volume from the access terminal is above the threshold, wherein the first connection request is configured to cause the radio access network to allocate a dedicated radio channel for communication with the access terminal, and the fourth set of codes is further for establishing the new connection with the radio access network over the dedicated radio channel; or
a fifth set of codes for, when the traffic volume is below the threshold, transmitting to the radio access network a second connection request containing a TVM indicator that the traffic volume from the access terminal is below the threshold, wherein the second connection request is configured to cause the radio access network to allocate a common radio channel for communication with the access terminal, and the fifth set of codes is further for establishing the new connection with the radio access network over the common radio channel;
wherein the dedicated radio channel includes a channel with a short discontinuous reception (DRX) cycle allocated by the radio access network to the access terminal in response to the first connection request and wherein the radio access network is a long term evolution (LTE) network.

19. The computer program product of claim 18, wherein the dedicated radio channel is exclusively used by the access terminal for communication with the radio access network and wherein the radio access network is a UTRAN.

20. The computer program product of claim 18, wherein the common radio channel is shared by a plurality of access terminals for communication with the radio access network and wherein the radio access network is a UTRAN.

21. An apparatus for establishing connection with a radio access network, the apparatus comprising:
means for receiving from a radio access network a broadcast message containing one or more of (i) an indicator that the radio access network accepts traffic volume measurements (TVM) from access terminals and (ii) an associated traffic volume threshold for the access terminals;
means for measuring at the access terminal the traffic volume for the radio access network before requesting a new connection with the radio access network;
means for comparing the measured traffic volume with the traffic volume threshold; and
means for, when the traffic volume is above the threshold, transmitting to the radio access network a first connection request containing a TVM indicator that the measured traffic volume from the access terminal is above the threshold, wherein the first connection request is configured to cause the radio access network to allocate a dedicated radio channel for communication with the access terminal, and further including means for establishing the new connection with the radio access network over the dedicated radio channel; or means for, when the traffic volume is below the threshold, transmitting to the radio access network a second connection request containing a TVM indicator that the traffic volume from the access terminal is below the threshold, wherein the second connection request is configured to cause the radio access network to allocate a common radio channel for communication with the access terminal, and further comprising means for establishing the new connection with the radio access network over the common radio channel;

wherein the dedicated radio channel includes a channel with a short discontinuous reception (DRX) cycle allocated by the radio access network to the access terminal in response to the first connection request and wherein the radio access network is a long term evolution (LTE) network.

22. The apparatus of claim 21, wherein the dedicated radio channel is exclusively used by the access terminal for communication with the radio access network and wherein the radio access network is a UTRAN.

23. The apparatus of claim 21, wherein the common radio channel is shared by a plurality of access terminals for communication with the radio access network and wherein the radio access network is a UTRAN.

* * * * *